(12) United States Patent
Lush

(10) Patent No.: US 7,992,520 B2
(45) Date of Patent: Aug. 9, 2011

(54) SQUIRREL-PROOF BIRD FEEDER AND FEED LEVEL CONTROL DEVICE

(76) Inventor: Raymon W. Lush, Bloomfield, NE (US)

( * ) Notice: Subject to any disclaimer, the term of this patent is extended or adjusted under 35 U.S.C. 154(b) by 138 days.

(21) Appl. No.: 12/454,281

(22) Filed: May 15, 2009

(65) Prior Publication Data

US 2010/0288200 A1    Nov. 18, 2010

(51) Int. Cl.
*A01K 39/01*    (2006.01)
(52) U.S. Cl. .................................... 119/57.9; 119/52.3
(58) Field of Classification Search ............... 119/51.01, 119/52.2, 52.3, 57.8, 57.9
See application file for complete search history.

(56) References Cited

U.S. PATENT DOCUMENTS

| | | | | |
|---|---|---|---|---|
| 4,646,686 | A | * | 3/1987 | Furlani ........................ 119/57.9 |
| 5,016,573 | A | * | 5/1991 | Power .......................... 119/57.9 |
| 5,111,772 | A | | 5/1992 | Lipton |
| 5,720,238 | A | | 2/1998 | Drakos |
| 6,253,707 | B1 | * | 7/2001 | Cote ........................... 119/57.9 |
| 6,543,384 | B2 | | 4/2003 | Cote |
| 6,591,781 | B2 | | 7/2003 | Hardison |
| D486,272 | S | | 2/2004 | Donegan |
| D498,335 | S | | 11/2004 | Donegan |
| 7,191,731 | B2 | * | 3/2007 | Cote ........................... 119/57.9 |
| 7,198,004 | B1 | | 4/2007 | Lush |
| 7,540,260 | B2 | | 6/2009 | Rich et al. |

* cited by examiner

*Primary Examiner* — Rob Swiatek
*Assistant Examiner* — Kathryn L Thompson
(74) *Attorney, Agent, or Firm* — Dennis L. Thomte; Thomte Patent Law Office LLC

(57) ABSTRACT

A squirrel-proof bird feeder and feed level control device is described. The bird feeder includes a vertically disposed inner housing member which is positioned within a vertically disposed outer housing member with each of the housing members including a plurality of vertically spaced-apart housing segments. The spacing of the housing segments divide feed openings therebetween. A combination feed level control and feed port device is positioned between each of the housing segments of the inner housing member so that feed ports are provided therebetween. The outer housing member has a plurality of feed openings formed therein which register with the feed ports of the combination devices when the outer housing member is in its first position. If a squirrel should move onto the outer housing member, the outer housing member moves downwardly with respect to the inner housing member so that the feed openings in the outer housing member do not register with the feed ports of the combination devices. A spring interconnects the inner and outer housing members to yieldably maintain the outer housing member in its first position. The combination feed level control and feed ports not only function as a feed level control mechanism but also provide feed ports at the lower end thereof.

10 Claims, 10 Drawing Sheets

SQUIRREL-PROOF BIRD FEEDER AND FEED LEVEL CONTROL DEVICE

BACKGROUND OF THE INVENTION

1. Field of the Invention

This invention relates to a squirrel-proof bird feeder and more particularly to a means for denying feeding access to squirrels by way of a unique connection system between inner and outer housing members of the feeder. More particularly, this invention relates to a unique feed level control device which may be used on various types of bird feeders.

2. Description of the Related Art

Many types of squirrel-proof bird feeders have been previously provided but it is believed that they suffer from certain disadvantages. First, some of the squirrel-proof bird feeders of the prior art are constructed of wood or plastic which may be damaged by an aggressive squirrel. Secondly, it is believed that the mechanisms of the prior art for closing feed ports of a bird feeder if a squirrel moves onto the feeder are not reliable and are difficult to maintain. Third, it is believed that the squirrel-proof feeders of the prior art do not have adequate feed level control devices associated therewith.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In the preferred embodiment, a squirrel-proof bird feeder is described which includes an inner housing member comprising a plurality of vertically spaced-apart housing segments which are comprised of expanded metal, woven wire, perforated metal or mesh materials, the sizing of the openings thereof which prevents feed contained therein from passing outwardly therethrough. Between each of the housing segments, a feed level control device is positioned which defines feed openings therein. A modified form of the feed level control device is positioned at the lower end of the lower most housing segment which functions as a feed dispenser. The inner housing member is positioned within an outer housing member with the outer housing member being vertically movable with respect to the inner housing member. The outer housing member has a plurality of vertically spaced-apart housing segments with a feed opening being provided between adjacent housing segments and a feed opening being provided at the lower end of the outer housing. A spring connects the outer housing member to the inner housing member which normally causes the feed openings in the outer housing member to register with the feed openings in the inner housing member. If a squirrel should move onto the outer housing member, the outer housing member moves downwardly with respect to the inner housing member so that the feed openings in the outer housing member no longer register with the feed openings in the inner housing member.

A novel feed level control device is also disclosed which is ideally suited for use with the bird feeders described herein but which may be used with a variety of different feeders. Modified forms of the bird feeder are also disclosed.

It is therefore a principal object of the invention to provide an improved squirrel-proof bird feeder.

A further object of the invention is to provide a squirrel-proof bird feeder which is comprised entirely of metal.

A further object of the invention is to provide a squirrel-proof bird feeder which may be comprised of woven wire, expanded metal, perforated metal or wire mesh.

A further object of the invention is to provide a squirrel-proof bird feeder which is reliable.

Yet another object of the invention is to provide a feed level control device for use with the preferred embodiment but which may also be used with other types of bird feeders which are not squirrel-proof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
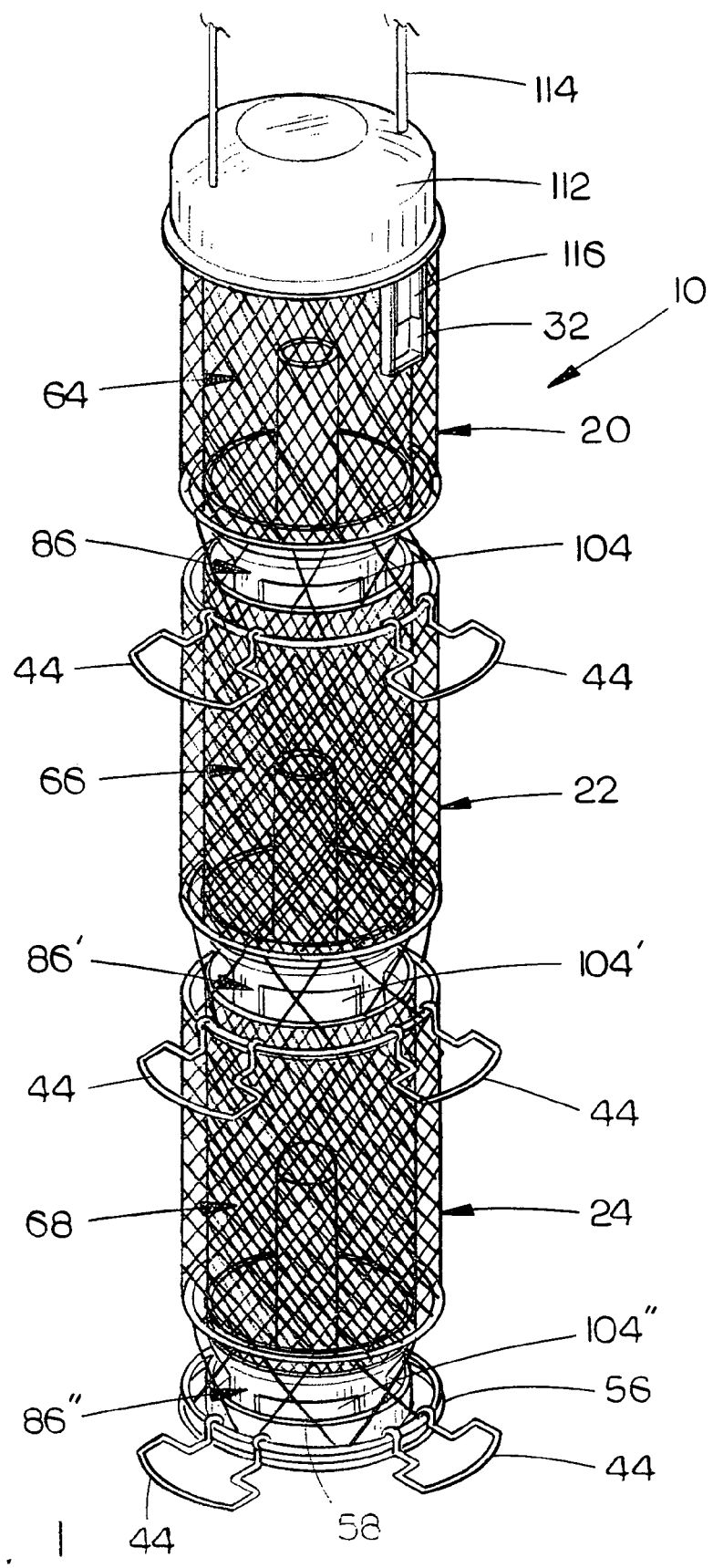
FIG. 1 is a perspective view of the bird feeder of this invention with the feed openings in the inner housing member communicating with the feed openings in the outer housing member.
Figure 2:
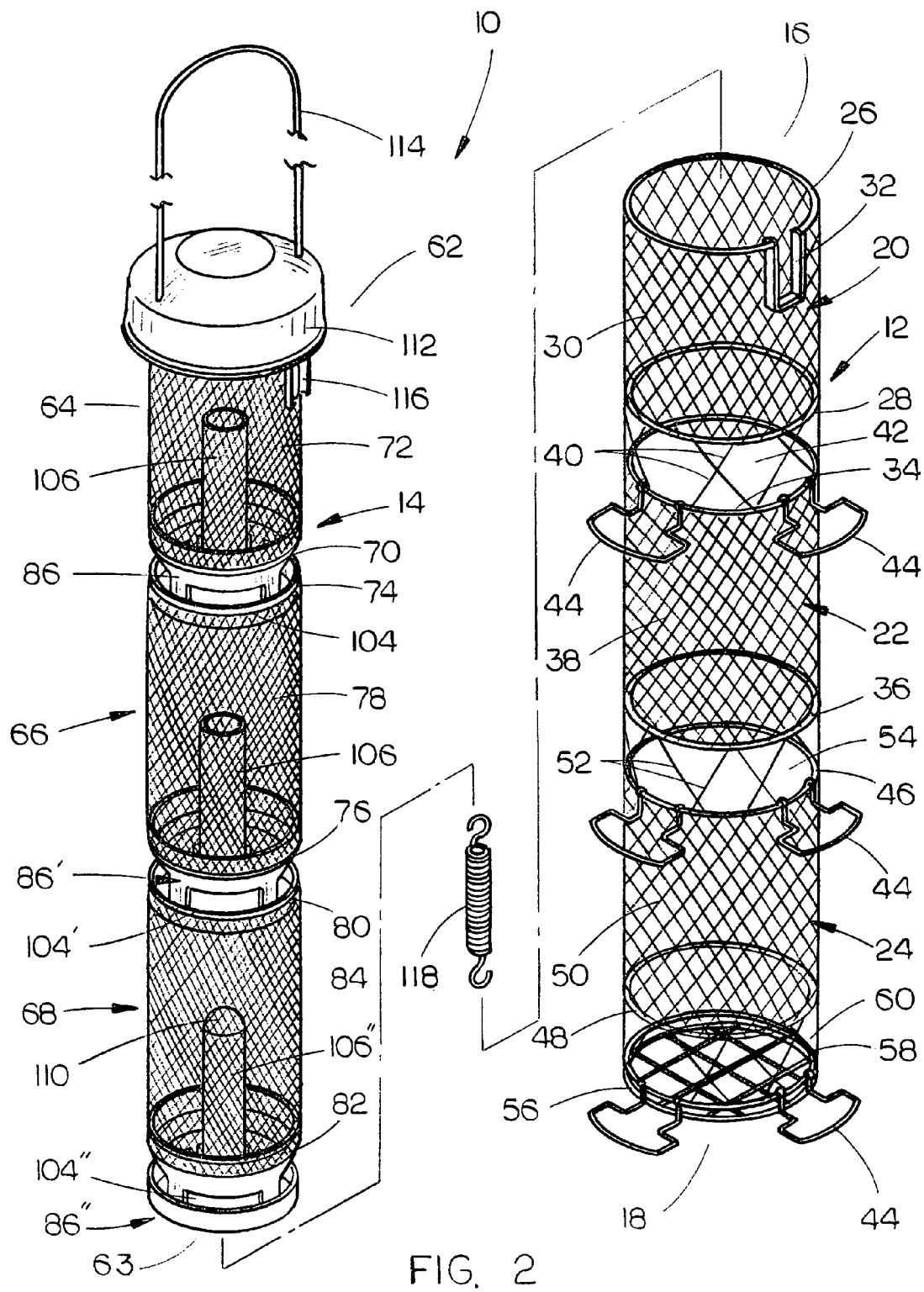
FIG. 2 is an exploded perspective view of the feeder of FIG. 1.
Figure 3:
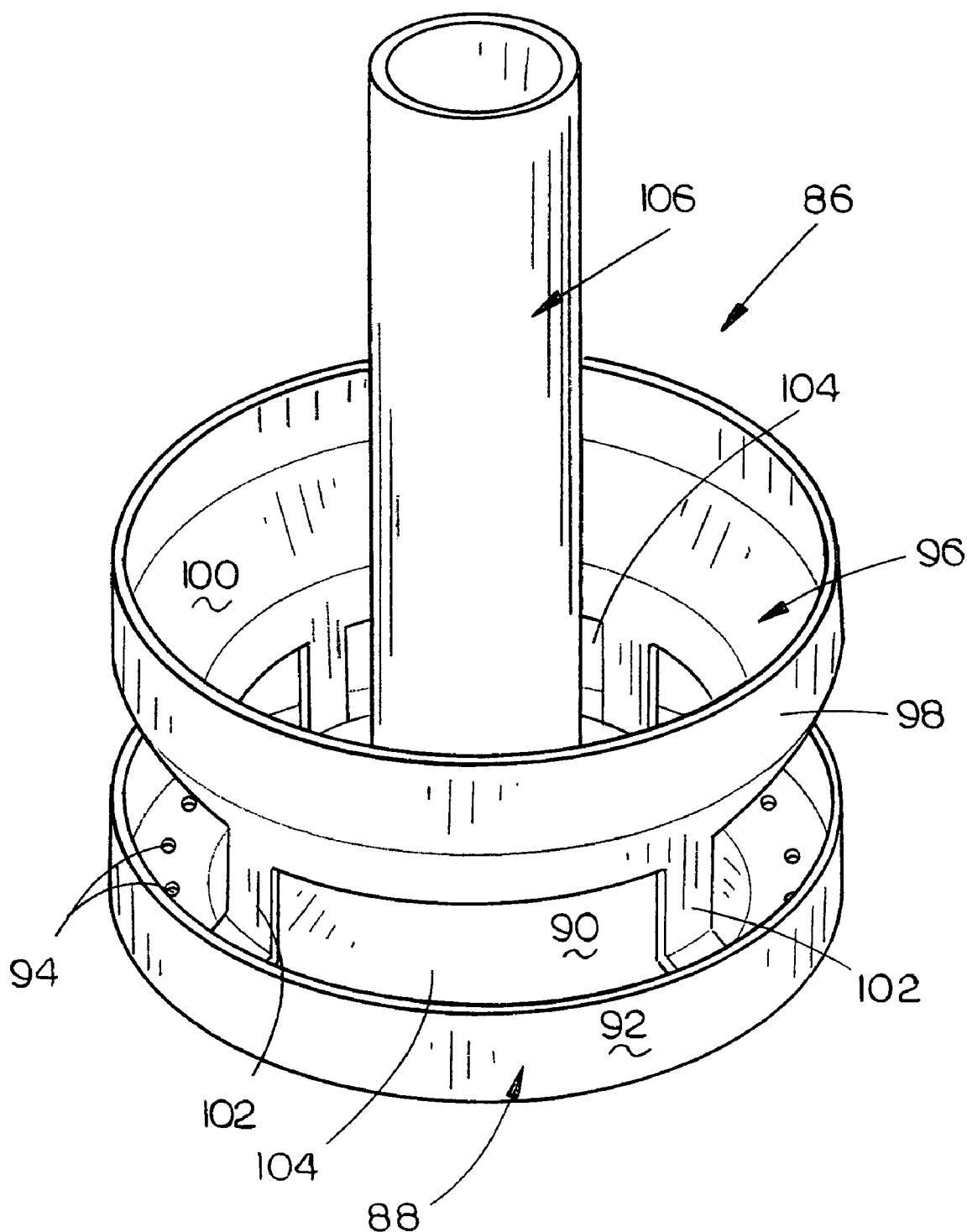
FIG. 3 is a perspective view of the feed level control device of this invention.
Figure 4:
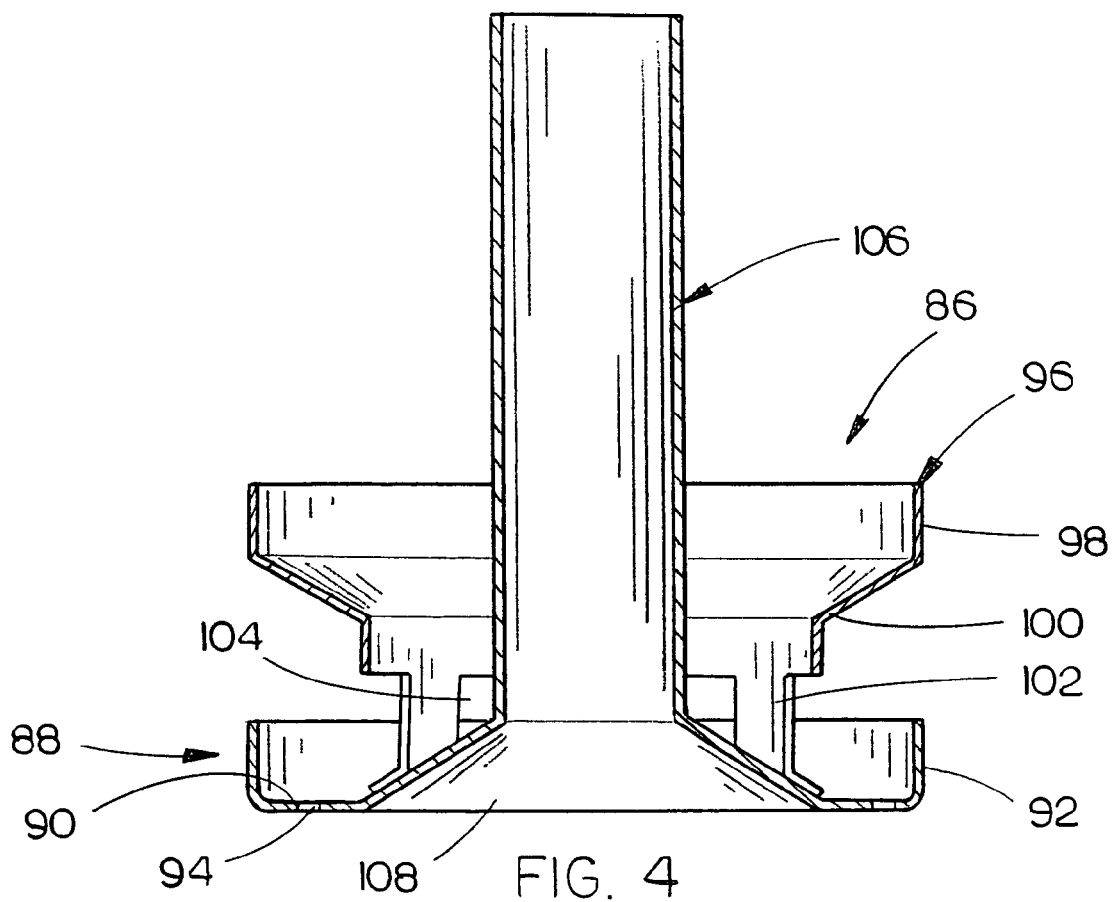
FIG. 4 is a vertical sectional view of the device of FIG. 3.

The bird feeder of FIGS. 1 and 2 is referred to by the reference numeral 10 and is seen to include an outer housing member 12 which vertically movably embraces an inner housing member 14. Although the housing members 12 and 14 are shown to be cylindrical, they could have a square or rectangular cross-section. The housing members 12 and 14 are constructed of a metal material rather than plastic or wood to prevent squirrels from chewing on the same.

Housing member 12 will be described as having, an upper end 16 and a lower end 18. Housing member 12 includes a plurality of vertically spaced-apart housing segments 20, 22 and 24. Although housing member 12 is shown to have three housing segments, inner housing member 12 could have any number of housing segments.

Housing segment 20 includes an upper ring 26 and a lower ring 28 having an expanded metal or mesh wall 30 secured thereto and extending therebetween. Preferably, a guide slot 32 is provided at the upper end of segment 20 as seen in FIG. 2. Segment 22 includes an upper ring 34 and a lower ring 36 having an expanded metal or mesh wall 38 secured thereto and extending therebetween. A plurality of rigid support wires 40 are secured to lower ring 28 and upper ring 34 to maintain the segments 20 and 22 in a spaced-apart relationship. The spacing of lower ring 28 and upper ring 34 creates a ring-shaped feed opening therebetween which is designated by the reference numeral 42. Preferably, a plurality of perches 44 are pivotally secured to upper ring 34 of segment 22 as seen in FIG. 2.

Segment 24 includes an upper ring 46 and a lower ring 48 having an expanded metal or mesh wall 50 secured thereto and extending therebetween. A plurality of rigid support wires 52 are secured to lower ring 36 and upper ring 46 to maintain the segments 22 and 24 in a spaced-apart relationship. The spacing of lower ring 36 and upper ring 46 creates a ring-shaped feed opening therebetween which is designated by the reference numeral 54. Preferably, perches 44 are pivotally secured to upper ring 46 of segment 24.

Housing member 12 includes a ring-shaped support 56 which is positioned below lower ring 48 of segment 24. A plurality of rigid support wires 58 are secured to and extend between lower ring 48 of segment 24 and the ring-shaped support 56 to maintain lower ring 48 and support 56 in a spaced-apart relationship and to define a ring-shaped feed opening 60 therebetween. Preferably, perches 44 are pivotally connected to support 56. The size of the openings in the expanded metal or mesh walls 30, 38 and 50 is such so as to prevent squirrels from feeding therethrough as will be described in more detail hereinafter.

For purposes of description, inner housing member 14 will be described as having an upper end 60 and a lower end 63. Housing member 14 includes a plurality of housing segments which are referred to by the reference numerals 64, 66 and 68. the number of housing segments in housing member 14 will correspond to the number of housing segments in housing member 12.

Housing segment 64 preferably includes an upper ring (not shown) and a lower ring with an expanded metal or mesh wall 72 secured thereto and extending therebetween. Housing segment 66 preferably includes an upper ring 74 and a lower ring 76 with an expanded metal or mesh wall 78 secured thereto and extending therebetween. Housing segment 68 includes an upper ring 80, a lower ring 82 with an expended metal or mesh wall 84 secured thereto and extending therebetween. It should be noted that the rings described above may not be necessary in all embodiments. The size of the openings in walls 72, 78 and 84 is such that feed contained in the associated segment cannot pass outwardly therethrough.

Figure 5:
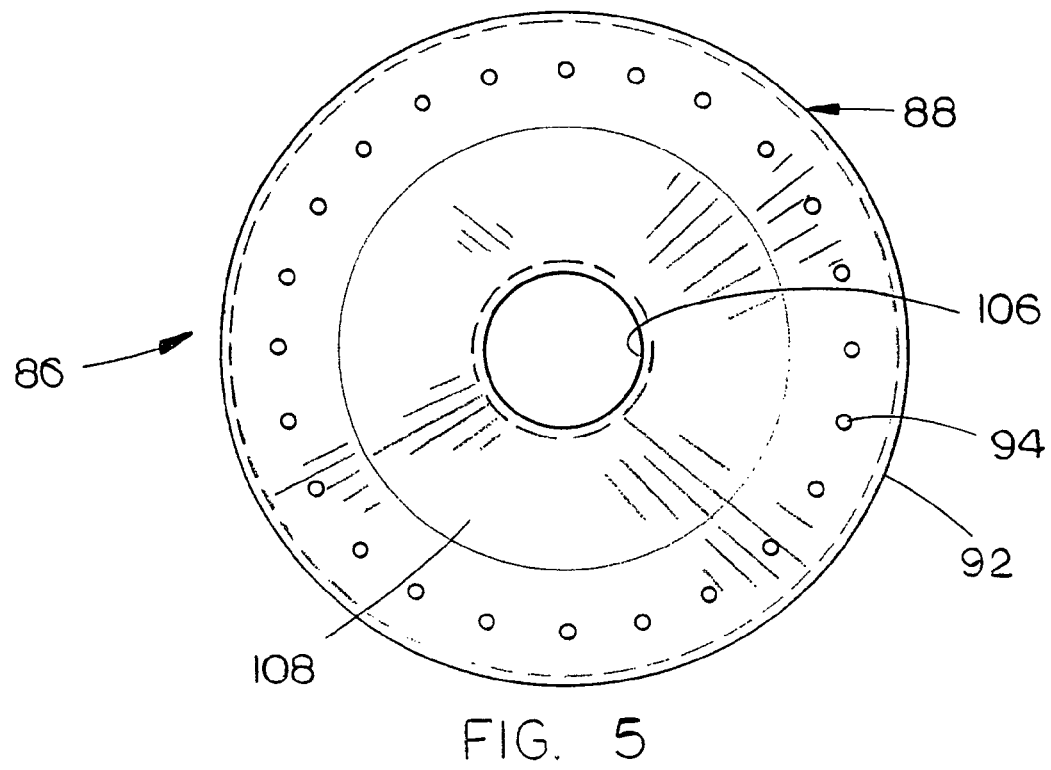
FIG. 5 is a bottom elevational view of the device of FIG. 3.
Figure 6:
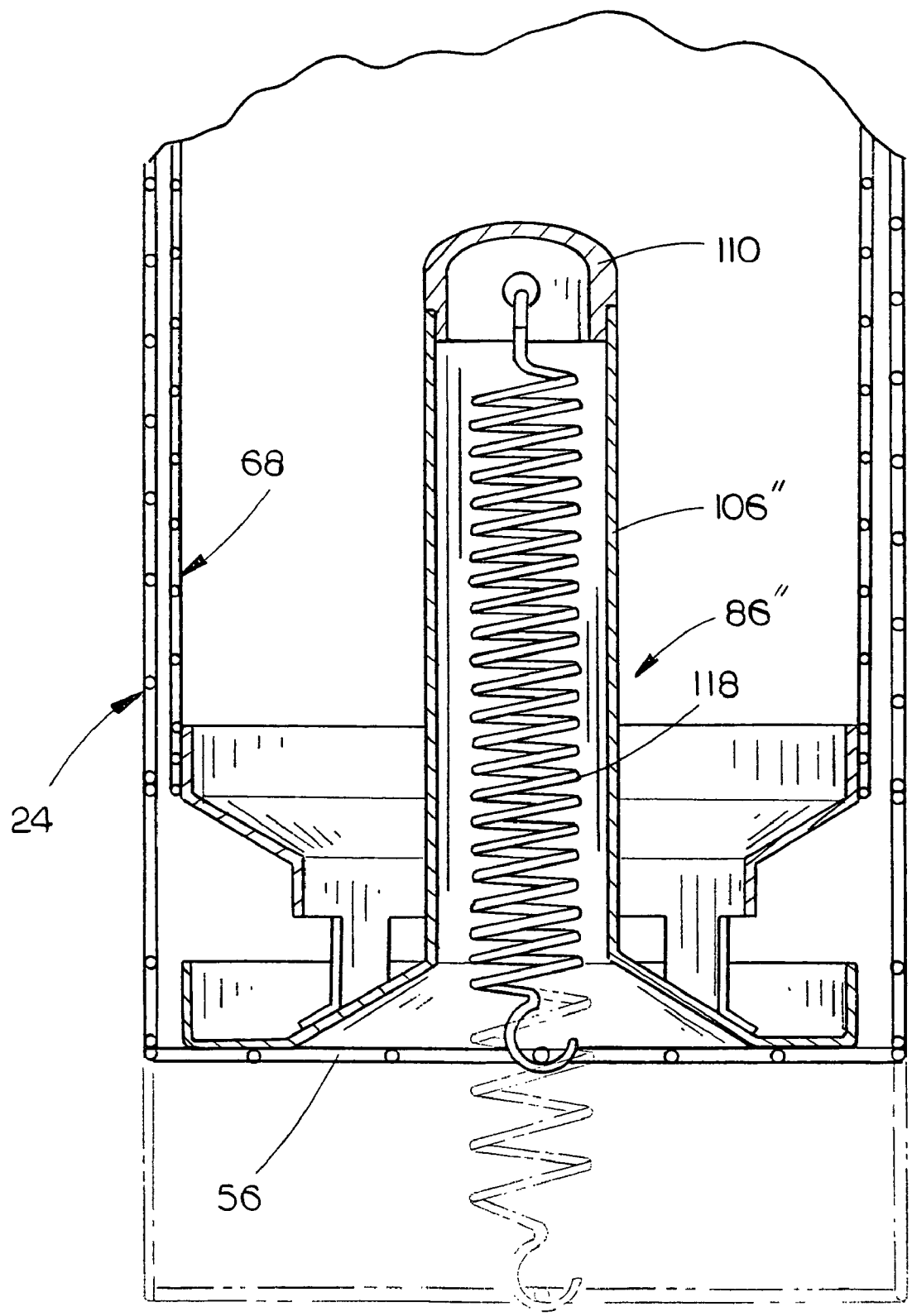
FIG. 6 is a partial sectional view of the feeder of FIG. 1 with the broken lines illustrating the manner in which the outer housing member moves downwardly with respect to the inner housing member should a squirrel move on to the outer housing member.
Figure 7:
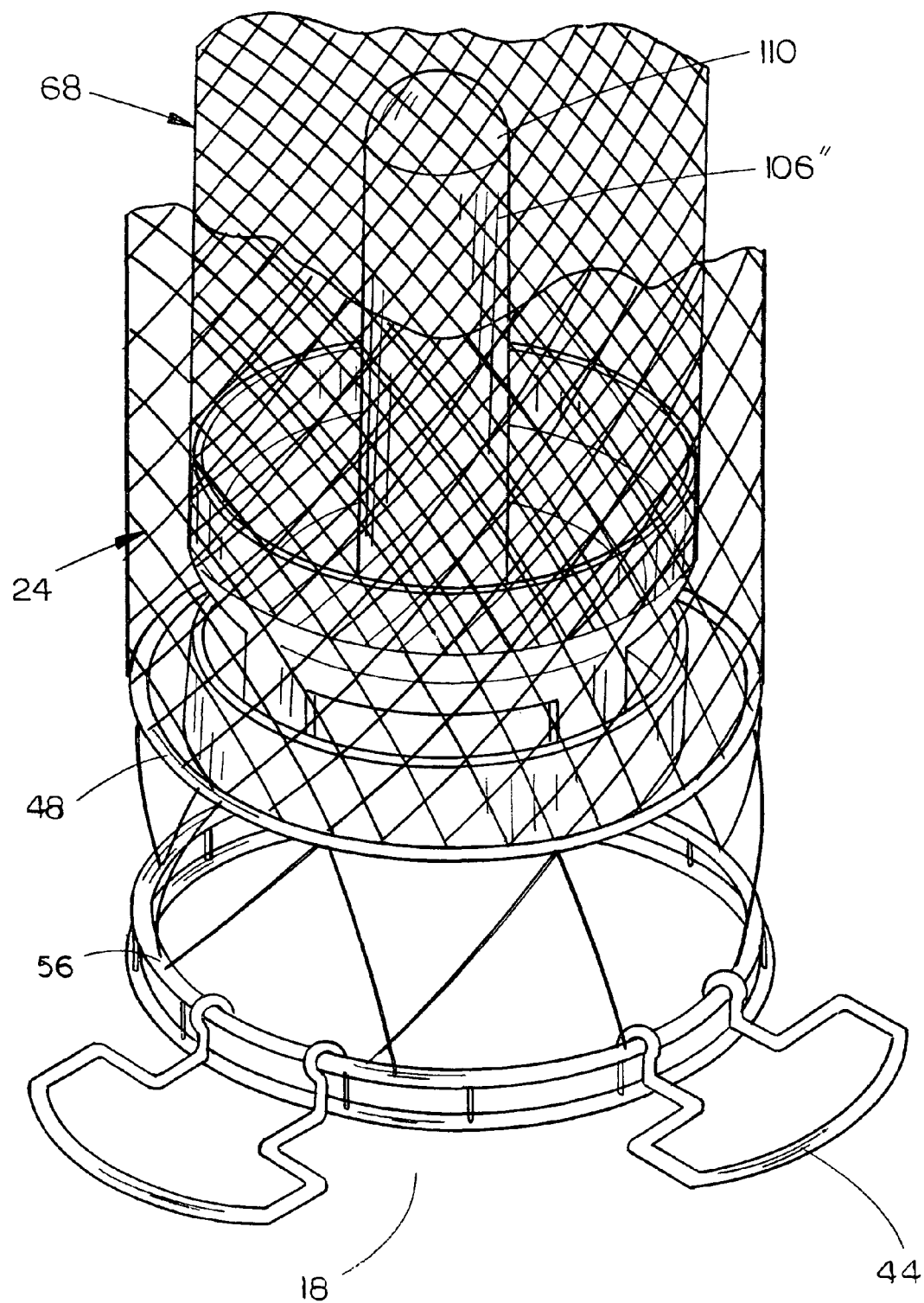
FIG. 7 is a partial bottom perspective view of the feeder of FIG. 1.

The numeral 86 refers to a feed level control device which also serves as a feed port and which is positioned between the lower end of housing segment 64 and the upper end of housing segment and which is secured thereto. The numeral 86' refers to a feed level control device and feed port which is positioned between the lower end of housing segment 66 and the upper end of housing segment 68 and which is secured thereto. The numeral 86' refers to a feed level control device and feed port which is positioned between the lower end of housing segment 66 and the upper end of housing segment 68 and which is secured thereto. The numeral 86" refers to a device which is identical to devices 86 and 86' but which does not function as a feed level control in the true sense of the word. Device 86" is positioned at the lower end of housing segment 68 and is secured thereto. Inasmuch as devices 86, 86' and 86" are identical, only device 86 will be described in detail. Device 86 includes a cup-shaped or ring-shaped trough 88 including a bottom wall 90 and an upstanding side wall 92. Bottom wall 90 is provided with very small openings 94 formed therein for drainage purposes but which are sized sufficiently small enough to prevent feed from passing therethrough. Device 86 includes a truncated funnel-like portion 96 which includes an upper side wall 98 and a sloped wall portion 100 extending downwardly and inwardly therefrom. A plurality of supports 102 extend from portion 96 to the trough 88 to define spaced-apart openings 104 therebetween. Device 86 includes a hollow tubular portion 106, the lower end of which communicates with opening 108 formed in bottom wall 90 of trough 88 as seen in FIG. 5. It should be noted that the upper end of tubular portion 106 of device 86" is closed by a cap 110 which performs a dual purpose which will be described hereinafter. All of the devices 86, 86' and 86" 88" are formed from a metal material. As seen in FIG. 2, the device 86 presents feed openings 104 between the lower end of segment 64 and the upper end of segment 68. As seen in FIG. 1, device 86" presents feed openings 104" between the lower end of segment 68 and the support 56.

Inner housing member 14 includes a cap or cover 112 and a hanger 114. Cap 112 has an inside diameter sufficiently large enough so as to be able to receive the upper end of housing member 12 therein. Housing segment 64 includes a guide 116 extending therefrom as seen in FIG. 2.

The bird feeder 10 is assembled as follows. The upper end of spring 118 is secured to cap 110 so that spring 118 is positioned in tubular portion 106". Inner housing member 14 is then extended downwardly into the open upper end of outer housing member until the lower end of device 86" rests on support 56 with guide 116 being received in guide slot 32. The lower end of spring 118 is then connected to support 56. At that time, spring 118 will yieldably urge outer housing member 12 to its upper position wherein feed openings 104 of device 86 will register with feed opening 42, feed openings 104' of device 86 will register with feed opening 54 and feed openings 104" will register with feed opening 60. Bird feed is then poured into the upper end of inner housing, member 14 with the tubular portions 106 and 106' causing feed to be maintained on the devices 86 and 86', up to the level of the upper end of the tubular portions 106 and 106' thereby functioning as level control devices in the manner described in my previous U.S. Pat. Nos. 7,198,104 and 7,302,911 so that bird feed will be available at different levels within the inner housing member 14. Birds may perch on the perches 44 and feed from the troughs 88, 88' and 88" and/or the feed openings 104, 104' and 104" on devices 86, 86' and 86".

As stated above, the openings in the segments 64, 66 and 68 of inner housing 14 are such that the bird feed therein will not flow outwardly therethrough. If a squirrel should jump or move onto the outer housing member 12, the weight of the squirrel will cause the outer housing member 12 to move downwardly with respect to the inner housing member 14 which will cause the feed openings 42, 54 and 60 to move downwardly with respect to the feed openings 104, 104' and 104" to close the same to deny the squirrel access to the feed.

The sizing of the openings in the walls 30, 38 and 50 is such that the squirrel cannot reach therethrough or feed therethrough.

When the squirrel moves from the outer housing member 12, the spring 118 causes the outer housing member 12 to move upwardly to its upper position SO that feed openings 42, 54 and 60 again register with the feeding areas of the devices 86, 86' and 86". Different springs 118 may be utilized to change the responsiveness of movement of the outer housing member 12 relative to inner housing member 14.

Figure 8:
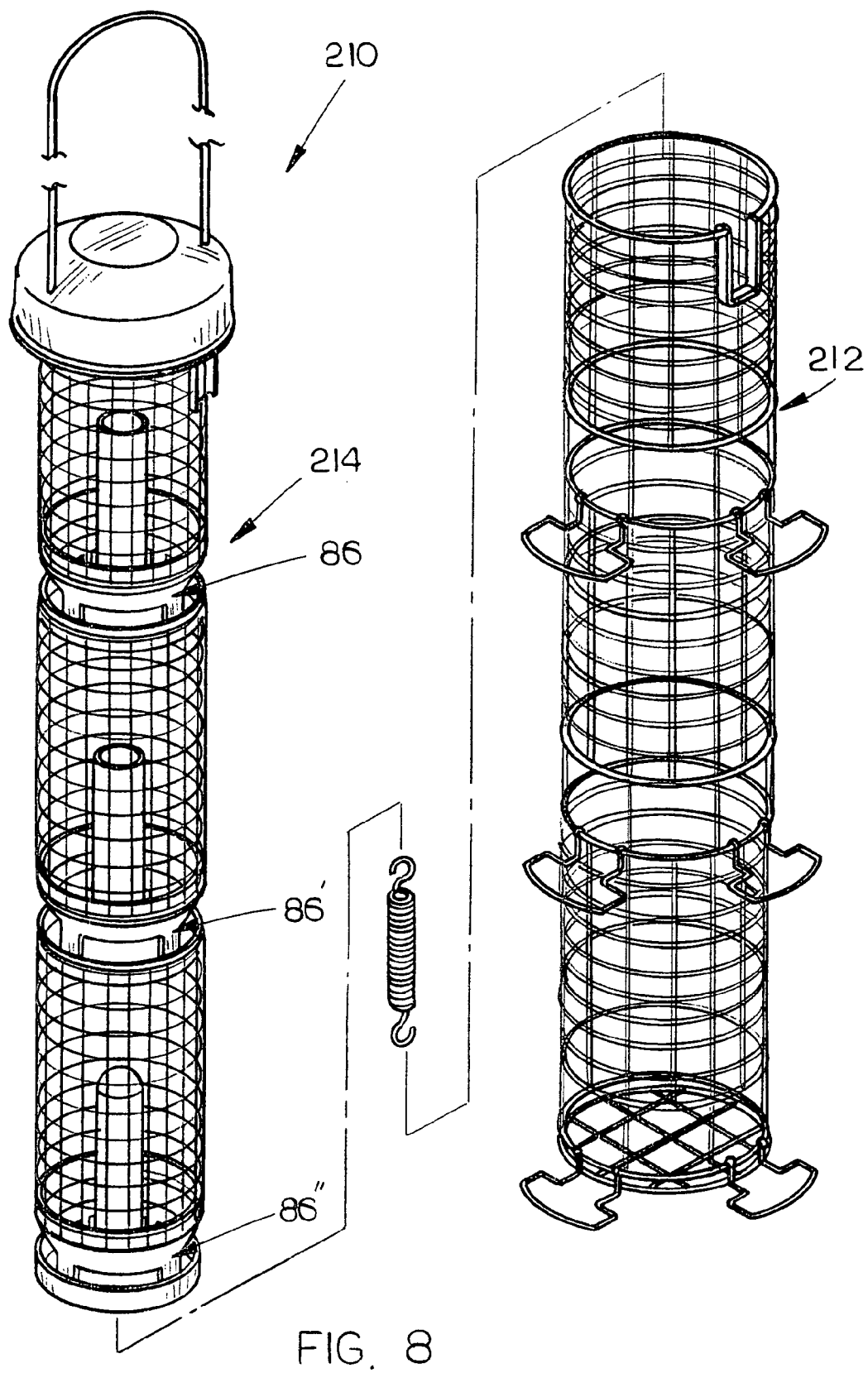
FIG. 8 is an exploded perspective view of a modified form of the invention.

FIG. 8 illustrates a modified form of the invention which is referred to by the reference numeral 210 and which includes an outer housing member 212 and an inner housing member 214. The only difference between feeder 210 and feeder 10 is that the housing members of feeder 210 are constructed of metal woven wire rather than the expanded metal or mesh of feeder 10. As seen in FIG. 8, the feeder 210 utilizes the devices 86, 86' and 86".

Figure 9:
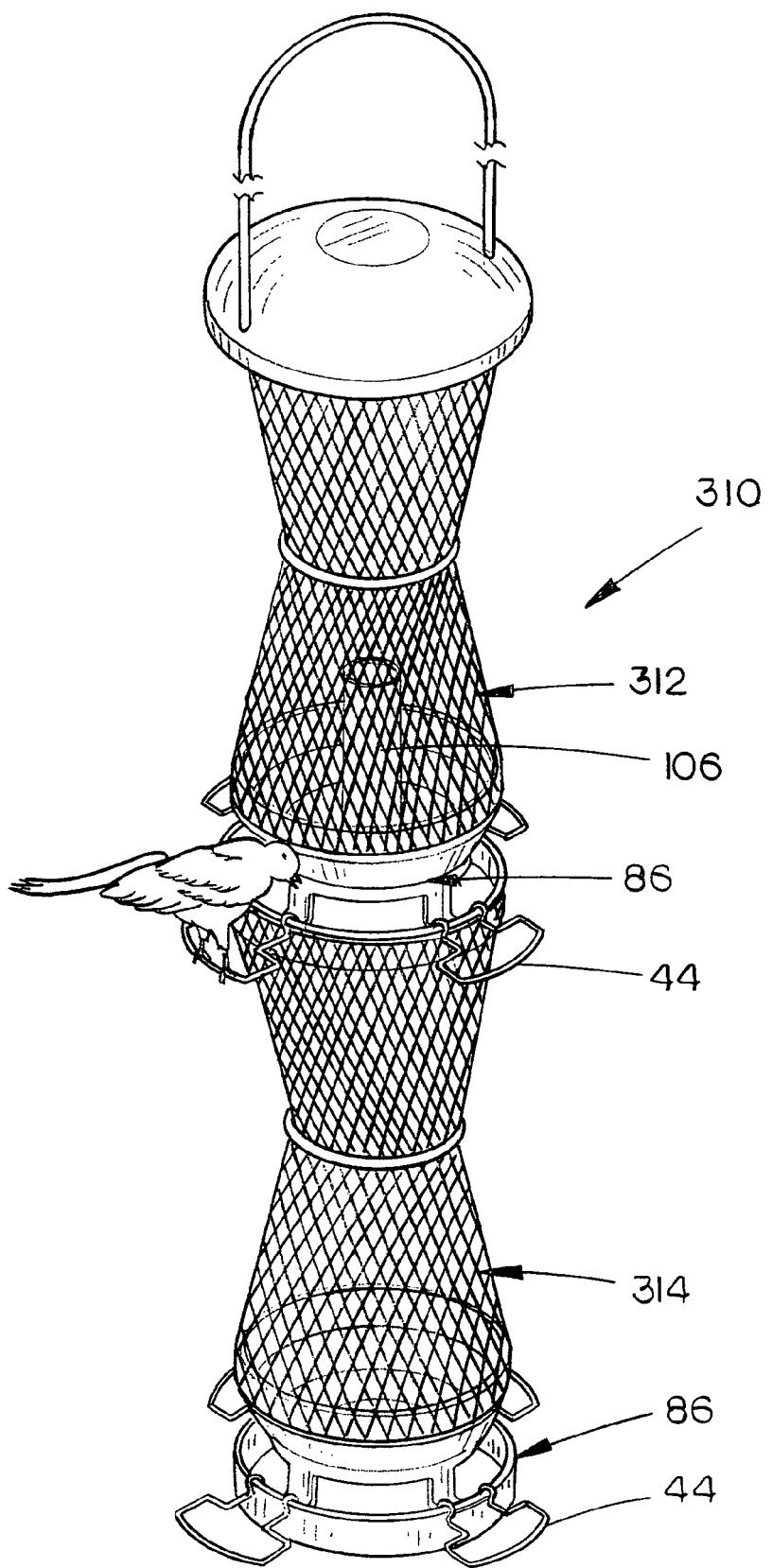
FIG. 9 is a perspective view of a bird feeder having the feed level control device of this invention mounted thereon.
Figure 10:
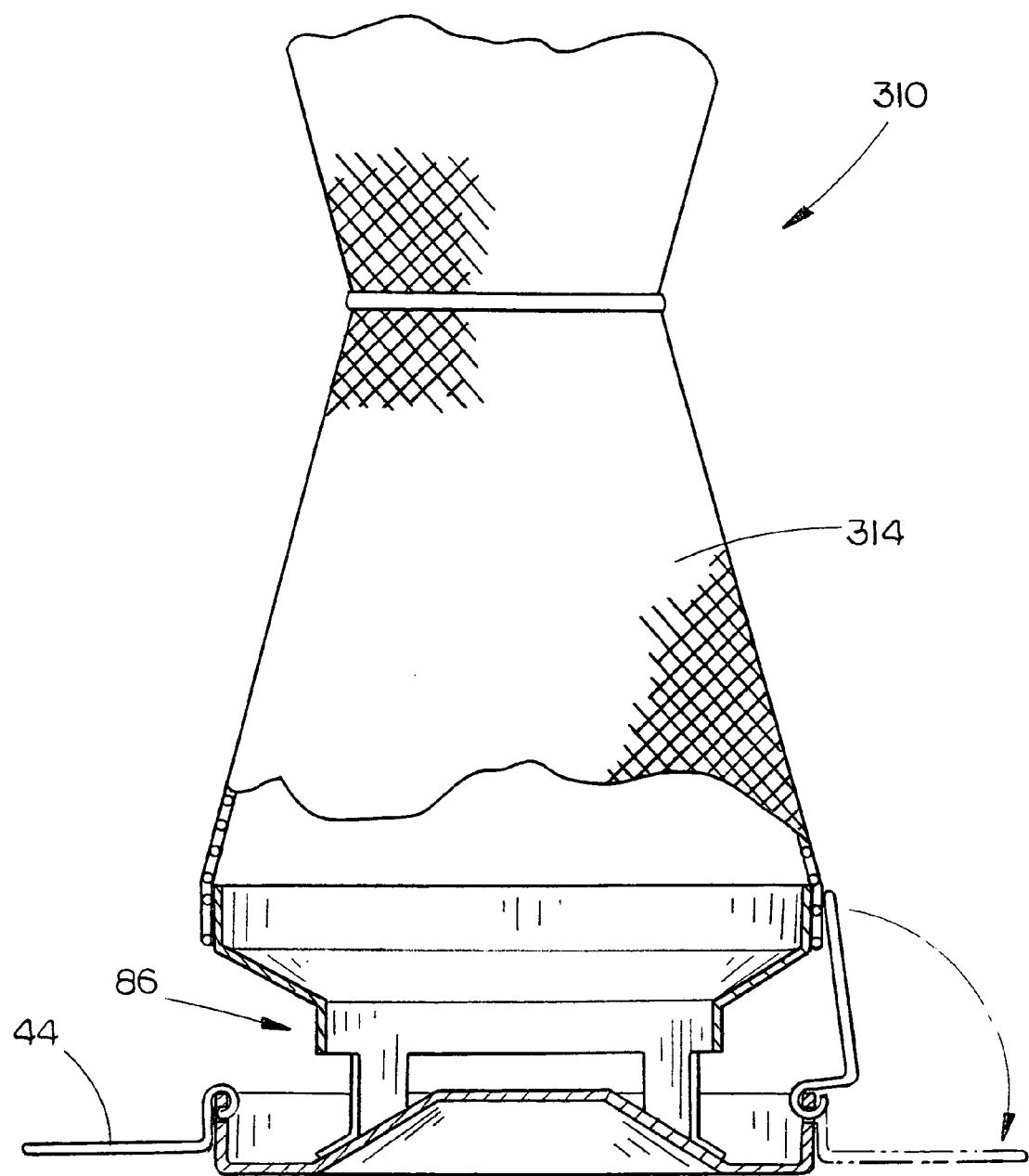
FIG. 10 is a partial side sectional view of the feeder of FIG. 9.

FIGS. 9 and 10 illustrate a further embodiment of the feeder and which is designated by the reference numeral 310. The feeder 310 is very similar to the feeder disclosed in my U.S. Pat. No. 6,047,661 except that feeder 310 has two "hour glass" feeder bodies 312 and 314 with a device 86 positioned therebetween and with a device 86, less the tubular portion, positioned at the lower end of body 314. The feeder 310 is not squirrel-proof but utilizes the improved device 86 previously described to function as feed level control devices.

Figure 11:
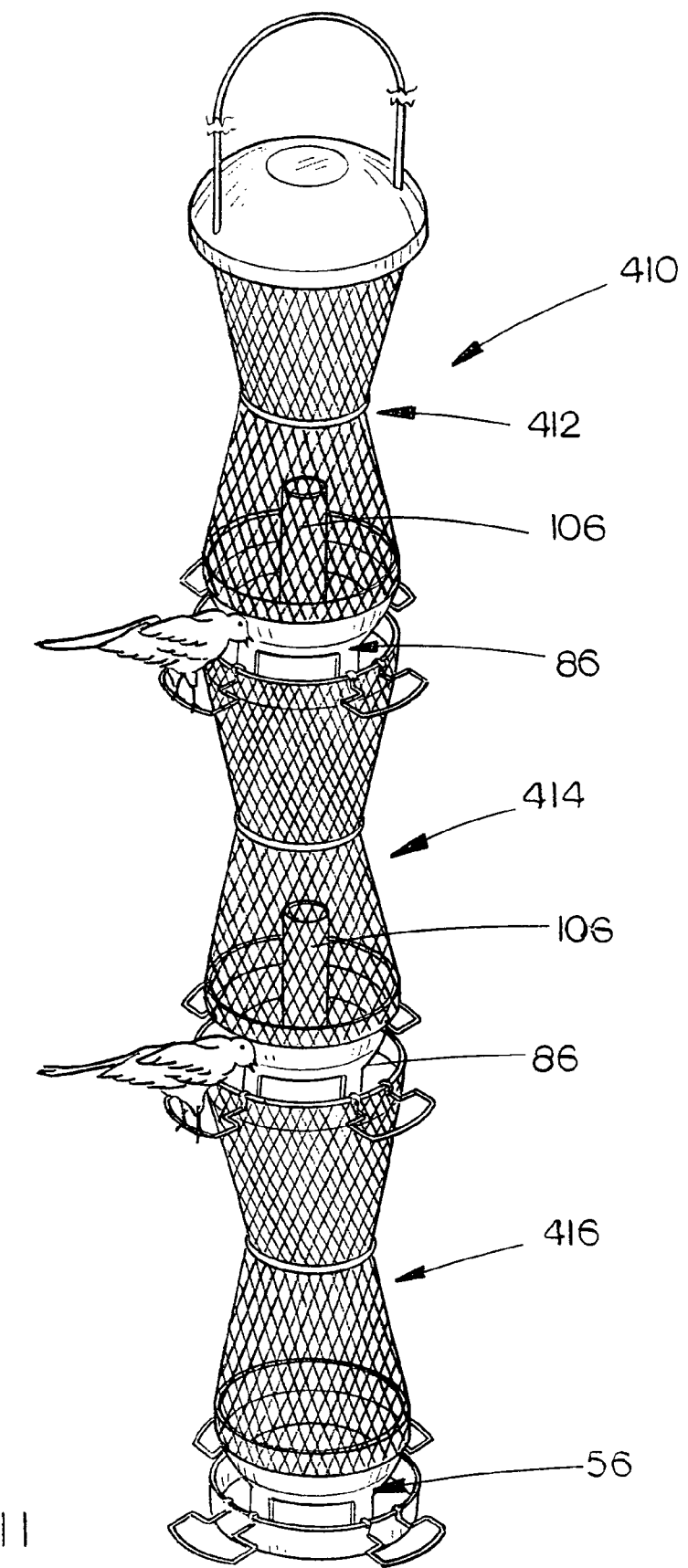
FIG. 11 is a perspective view of a modified form of the feeder of FIG. 9 with the feed level control device of this invention mounted therein.

FIG. 11 illustrates yet another embodiment of the feeder but which is not squirrel-proof. The feeder 410 of FIG. 11 is much like the feeder 310 except that three feeder bodies 412, 414 and 416 are utilized rather than two feeder bodies. A device 86 is positioned between the lower end of feeder body 412 and the upper end of feeder body 414 and a device 86 is positioned between the lower end of feeder body 414 and feeder body 416. A device 86, less the tubular portion, is mounted at the lower end of feeder body 416. The two uppermost devices 86 in FIG. 11 act as feed level control devices.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A squirrel-proof bird feeder, comprising:
a vertically disposed inner housing member, having upper and lower ends, a plurality of vertically spaced-apart housing segments having upper and lower ends;
the spacing of said housing segments defining feed openings therebetween;
said housing segments of said inner housing member being comprised of a metal material having openings formed therein which are sized so as to maintain feed therein;
a combination feed level control and feed port device positioned in each of said feed openings in said inner housing member which maintains a certain amount of feed at that level even though the main supply of feed has dropped below the combination feed level control and feed port device and which provides a feed port in the associated feed opening;
a vertically disposed outer housing member, having upper and lower ends, including a plurality of vertically spaced-apart housing segments;
the spacing of said housing segments defining feed openings therebetween;
said housing segments of said outer housing member being comprised of a metal material having openings formed therein;
said outer housing member including a support which is secured to a the lowermost housing segment of said outer housing member and which is spaced below the lower end of the lowermost housing segment thereof to define a feed opening therebetween;
said inner housing member having a feed port secured to a the lower end of a the lowermost housing segment thereof;
said inner housing member being positioned in said outer housing member;
said outer housing member being vertically movable between first and second positions with respect to said inner housing member;
said feed ports of said combination feed level control and feed port devices of said inner housing member registering with said feed openings between said housing segments of said outer housing member when said outer housing member is in its said first position;
said feed port at said lower end of the lowermost housing segment of said inner housing member registering with said feed opening below the lower end of the lowermost housing segment of said outer housing member when said outer housing member is in its said first position;
said feed openings between said housing segments of said outer housing member being positioned below said feed ports of said feed level control and feed port devices when said outer housing member is in its said second position;
said feed openings below the lower end of the lowermost housing segment of said outer housing member being positioned below said feed port at said lower end of the lowermost housing segment of said inner housing member when said outer housing member is in its said second position;
and a spring means interconnecting said inner and outer housing members to yieldably maintain said outer housing member in its said first position but will permit said outer housing member to move to its said second position if a squirrel should move onto said outer housing member.

2. The squirrel-proof bird feeder of claim 1 wherein said spring means interconnects said feed port at said lower end of the lowermost housing segment of said inner housing member to the lower end of said outer housing member.

3. The squirrel-proof bird feeder of claim 1 further including perches at said feed openings of said outer housing member.

4. The squirrel-proof bird feeder of claim 1 wherein said housing segments of said inner and outer housing members comprise a mesh material.

5. The squirrel-proof bird feeder of claim 1 wherein said housing segments of said inner and outer housing members comprise a perforated material.

6. The squirrel-proof bird feeder of claim 1 wherein said housing segments of said inner and outer housing members comprise a woven wire material.

7. The squirrel-proof bird feeder of claim 1 wherein said feed port below the lower end of the lowermost housing segment of said inner housing member includes a vertically disposed tube having a closed upper end and an open lower end; said spring means being positioned in said tube with an upper end thereof being secured to said tube and a lower end thereof being secured to said lower end of said outer housing member.

8. The squirrel-proof bird feeder of claim 1 wherein each of said combination feed level control and feed port includes a feed trough positioned adjacent the associate feed opening and wherein said feed port below the lower end of the lowermost housing segment of said inner housing which registers with said feed opening at the lower end of said outer housing member when said outer housing member is in its said first position.

9. The squirrel-proof bird feeder of claim 1 wherein said feed level control and feed port devices are comprised of a metal material and wherein said feed port at the lower end of said inner housing member is comprised of a metal material.

10. The squirrel-proof bird feeder of claim 1 wherein said outer and inner housing members are cylindrical in configuration.

* * * * *